United States Patent
Mayer et al.

(10) Patent No.: US 10,513,292 B2
(45) Date of Patent: Dec. 24, 2019

(54) METHOD AND DEVICE FOR PROVIDING AN ACCESS OPTION TO A VEHICLE INTERIOR

(71) Applicant: Robert Bosch GmbH, Stuttgart (DE)

(72) Inventors: Philipp Mayer, Stuttgart (DE); Stefan Nordbruch, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 197 days.

(21) Appl. No.: 15/551,997

(22) PCT Filed: Jan. 28, 2016

(86) PCT No.: PCT/EP2016/051750
§ 371 (c)(1),
(2) Date: Aug. 18, 2017

(87) PCT Pub. No.: WO2016/142097
PCT Pub. Date: Sep. 15, 2016

(65) Prior Publication Data
US 2018/0029642 A1  Feb. 1, 2018

(30) Foreign Application Priority Data

Mar. 11, 2015  (DE) .................. 10 2015 204 361

(51) Int. Cl.
*B62D 15/02*  (2006.01)
*G05D 1/00*   (2006.01)

(52) U.S. Cl.
CPC ....... *B62D 15/0285* (2013.01); *G05D 1/0011* (2013.01); *G05D 2201/0213* (2013.01)

(58) Field of Classification Search
CPC ............. B62D 15/0285; G05D 1/0011; G05D 2201/0213
See application file for complete search history.

(56) References Cited

U.S. PATENT DOCUMENTS

2013/0024049 A1* 1/2013 Yoshioka ............... B62D 1/00
                                                    701/2
2014/0222252 A1* 8/2014 Matters ............... B62D 15/027
                                                    701/2
(Continued)

FOREIGN PATENT DOCUMENTS

CN    103348296 A    10/2013
DE    102004027869 A1    1/2006
(Continued)

OTHER PUBLICATIONS

International Search Report dated Apr. 19, 2016, of the corresponding International Application PCT/EP2016/051750 filed Jan. 28, 2016.

*Primary Examiner* — Courtney D Heinle
(74) *Attorney, Agent, or Firm* — Gerard A. Messina; Norton Rose Fulbright US LLP

(57) ABSTRACT

A method for providing an access option to a vehicle interior of a vehicle parked at a parking position, including receiving an access request for an access to the vehicle interior via a communication network, in response to the received access request, ascertaining unparking data, based on which the vehicle may at least partially leave its parking position, to provide an access option to the vehicle interior by opening a vehicle window and/or a vehicle door, transmitting the ascertained unparking data to the vehicle via the communication network, —receiving a signal via the communication network that the access option is no longer needed, in response to the signal, ascertaining parking data, based on which the vehicle may drive back into its parking position, and transmitting the ascertained parking data to the vehicle via the communication network.

10 Claims, 5 Drawing Sheets

(56) References Cited

U.S. PATENT DOCUMENTS

| | | | | |
|---|---|---|---|---|
| 2014/0244073 A1* | 8/2014 | Okamura | ............ | B62D 15/0285 |
| | | | | 701/2 |
| 2015/0039213 A1* | 2/2015 | Stefan | ...................... | G08G 1/00 |
| | | | | 701/117 |
| 2015/0345965 A1* | 12/2015 | Semsey | ................... | G07B 15/02 |
| | | | | 701/537 |
| 2016/0371982 A1* | 12/2016 | Arndt | ...................... | G08G 1/143 |
| 2018/0307250 A1* | 10/2018 | Harvey | ................ | G05D 1/0297 |

FOREIGN PATENT DOCUMENTS

| | | |
|---|---|---|
| DE | 102005009703 A1 | 9/2006 |
| DE | 102011076567 A1 | 11/2012 |
| DE | 102012222562 A1 | 6/2014 |
| DE | 102013213379 A1 | 1/2015 |
| EP | 2617627 A2 | 7/2013 |
| JP | 2006048091 A | 2/2006 |
| JP | 2007295033 A | 11/2007 |
| JP | 2013177128 A | 9/2013 |
| WO | 2007122704 A1 | 11/2007 |
| WO | 2011132309 A1 | 10/2011 |
| WO | 2012124085 A1 | 9/2012 |
| WO | 2013053776 A2 | 4/2013 |

* cited by examiner

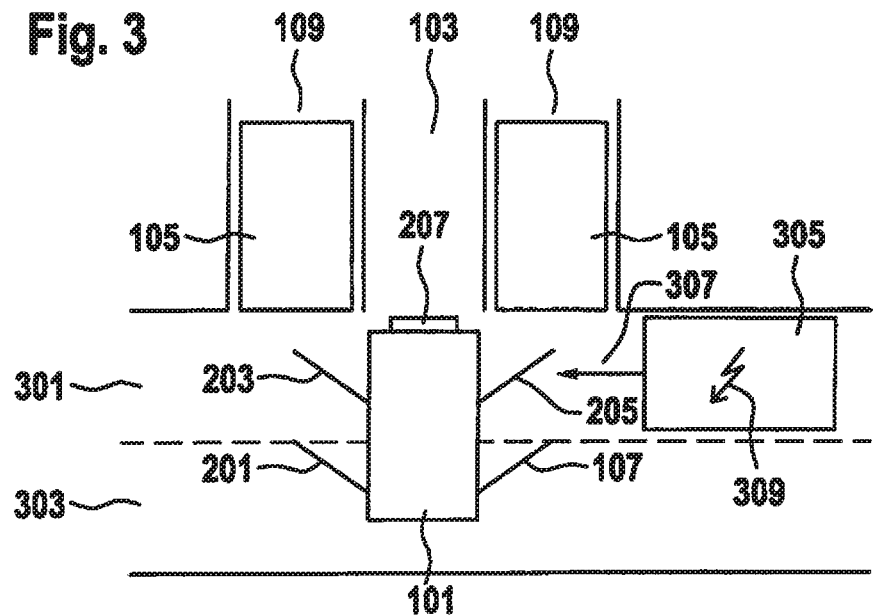
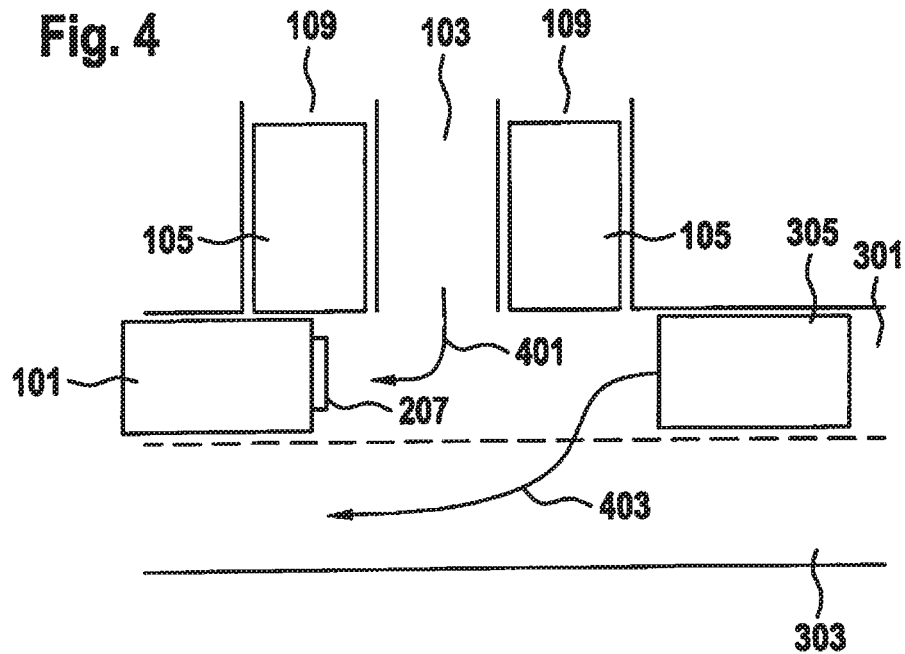

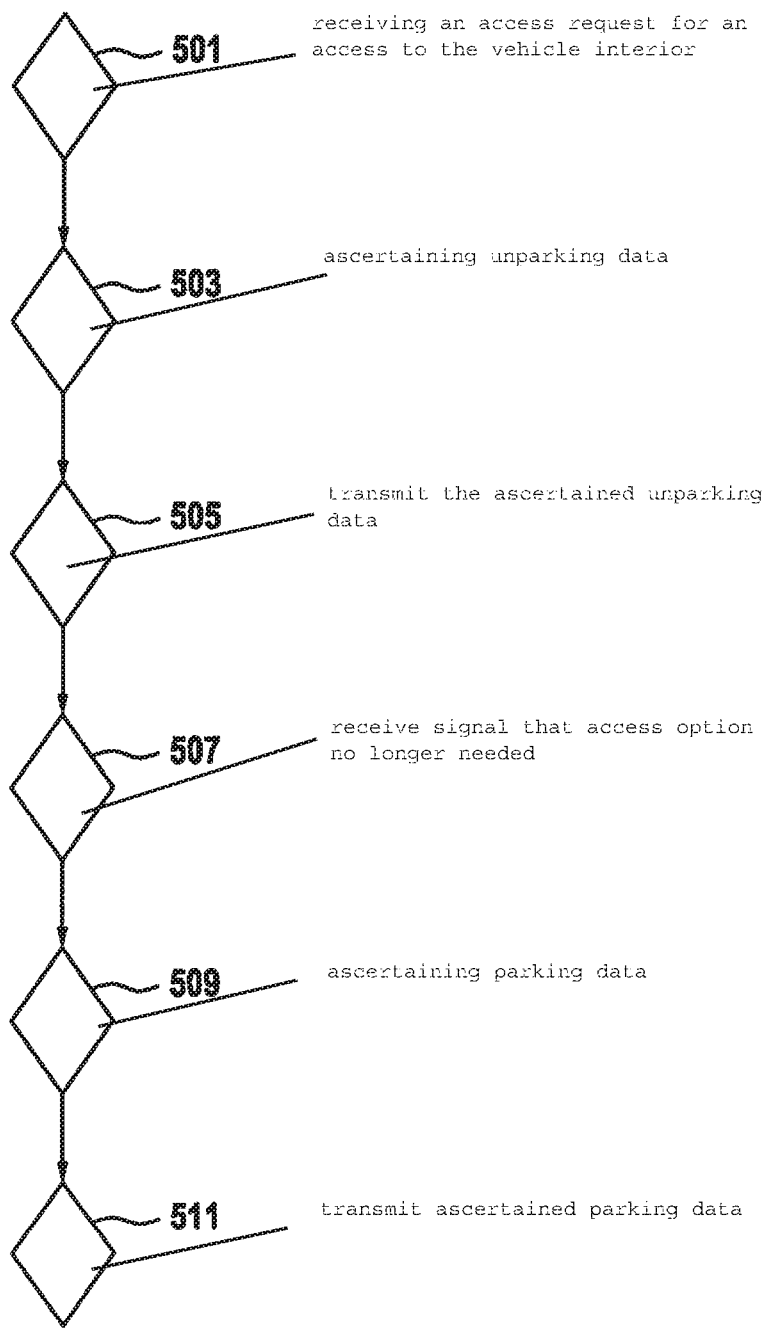

METHOD AND DEVICE FOR PROVIDING AN ACCESS OPTION TO A VEHICLE INTERIOR

FIELD

The present invention relates to a method and a device for providing an access option to a vehicle interior of a vehicle parked at a parking position. The present invention furthermore relates to a parking system for vehicles and a computer program.

BACKGROUND INFORMATION

German Patent Application No. DE 10 2012 222 562 A1 describes a system for managed parking areas for transferring a vehicle from a start position into a destination position.

In so-called fully automated (autonomous) valet parking (AVP), a vehicle is parked by its driver at a drop-off point, for example, in front of a parking garage, and from there the vehicle drives itself into a parking position/parking space and back to the drop-off point again.

In so-called autonomous valet parking, vehicles are thus generally parked fully automatically. The goal during parking is in particular to use an existing parking area very efficiently. Since drivers or passengers do not have to get out, the AVP vehicles generally may be parked very close to one another. In particular, the vehicles may be parked so closely that an access to the vehicle via the vehicle doors and/or via the trunk is, as the case may be, no longer possible, since they may no longer be sufficiently opened.

SUMMARY

An object of the present invention includes providing an efficient way to create an access option to a vehicle interior of a vehicle parked at a parking position.

This object may be achieved in accordance with the present invention. Advantageous embodiments of the present invention are described herein.

According to one aspect of the present invention, a method is provided for creating an access option to a vehicle interior of a vehicle parked at a parking position, including the following steps:
- receiving an access request for an access to the vehicle interior via a communication network,
- in response to the received access request, ascertaining unparking data, based on which the vehicle may at least partially leave its parking position, to provide an access option to the vehicle interior by opening a vehicle window and/or a vehicle door,
- transmitting the ascertained unparking data to the vehicle via the communication network,
- receiving a signal via the communication network that the access option is no longer needed,
- in response to the signal, ascertaining parking data, based on which the vehicle may drive back into its parking position, and
- transmitting the ascertained parking data to the vehicle via the communication network.

According to a further aspect, a device is provided for creating an access option to a vehicle interior of a vehicle parked at a parking position, including:
- a communication interface for receiving an access request for an access to the vehicle interior via a communication network,
- a processor for ascertaining unparking data in response to the received access request, based on which the vehicle may at least partially leave its parking position, to provide an access option to the vehicle interior by opening a vehicle window and/or a vehicle door,
- the communication interface being designed to transmit the ascertained unparking data to the vehicle via the communication network,
- the communication interface being designed to receive a signal via the communication network that the access option is no longer needed,
- the processor being designed to ascertain parking data in response to the received signal, based on which the vehicle may drive back into its parking position, and
- the communication interface being designed to transmit the ascertained parking data to the vehicle via the communication network.

According to another aspect, a parking system for vehicles is provided, the parking system including a parking facility having multiple parking positions and the device according to the present invention.

According to yet another aspect, a computer program is provided, which includes program code for carrying out the method according to the present invention when the computer program is executed on a computer.

The present invention thus includes in particular, inter alia, providing an access option to the vehicle interior by at least partially unparking the vehicle and parking it back in its parking position after an end of the access. This thus means in particular that only a temporary access option is provided. This yields the technical advantage in particular that an access option to the vehicle interior may be created efficiently. Thus, partially leaving the parking position is generally sufficient to open at least one vehicle door, thereby enabling an access to the vehicle interior.

A vehicle interior includes in particular a passenger compartment and/or in particular a trunk. A vehicle door includes, for example, a vehicle door for an access to the passenger compartment, i.e., for example: driver door, passenger door, vehicle door for rear passengers. A vehicle door includes, for example, a trunk lid and/or a trunk door. A vehicle window is in particular a window of a vehicle door.

According to one specific embodiment, the vehicle at least partially, in particular completely, leaves its parking position based on the unparking data. The vehicle thus unparks at least partially, in particular completely.

In one specific embodiment, the vehicle drives back into its parking position based on the parking data, thus parks again.

According to one specific embodiment, the vehicle leaving its parking position may mean that the vehicle moves away up to at most a predetermined distance, for example, five vehicle lengths for example, 10 m, from its parking position.

A parking facility within the meaning of the present invention may also be referred to as a parking area and is used as a parking lot for vehicles. The parking facility therefore forms in particular a contiguous area, which has multiple parking spaces (in the case of a parking facility on private property) or parking zones (in the case of a parking facility on public property). According to one specific embodiment, the parking facility may include a parking deck. In particular, the parking facility includes a parking garage.

According to one specific embodiment, the unparking data and/or the parking data include one or more remote control commands, based on which the vehicle is unparked and/or parked by remote control. This thus means in particular that according to this specific embodiment, the vehicle drives by remote control. This thus means that the vehicle at least partially leaves its parking position by remote control and/or drives back into its parking position by remote control. This yields the technical advantage in particular that the vehicle itself does not have to have an autonomous parking and unparking functionality. This thus means in particular that the vehicle itself does not have to be capable of parking and/or unparking autonomously. Lesser technical demands are thus placed on the vehicle. The efficient concept according to the present invention is therefore also applicable to vehicles which do not have such an autonomous parking and/or unparking functionality.

According to another specific embodiment it is provided that the unparking data and/or the parking data include those data, based on which the vehicle may unpark and/or park autonomously. This thus means in particular that according to this specific embodiment it is provided that the vehicle unparks and/or parks autonomously, i.e., independently. This thus means in particular that the vehicle at least partially leaves the parking position autonomously and/or drives back into the parking position autonomously. This yields the technical advantage in particular that, for example, an operator of a parking facility is relieved of this task. The operator thus advantageously has to provide or apply fewer resources, in particular technical resources, for this purpose, for example.

Those data, based on which the vehicle may unpark and/or park autonomously, include in particular map data of a digital map. In particular, such data include trajectory data of a trajectory which the vehicle is to follow for parking and/or unparking.

According to one specific embodiment, a combination may be provided of the above-mentioned two specific embodiments with respect to the remote-controlled and the autonomous driving of the vehicle. This thus means in particular that the vehicle partially drives by remote control and partially drives autonomously as it leaves and/or as it returns back into the parking position. This yields the technical advantage in particular that the advantages of both specific embodiments may be combined with one another. The vehicle may thus advantageously be assisted at those points or locations at which the autonomous driving is very complex or difficult to carry out.

According to another specific embodiment it is provided that in response to the received access request, position data of the parking position are transmitted via the communication network. This yields the technical advantage in particular that the person who wishes to obtain access to the vehicle interior knows where the vehicle is located.

Autonomous within the meaning of the present invention means in particular that the vehicle may navigate or drive independently, i.e., without an intervention of a driver, on a parking facility, in particular may park and/or unpark. This thus means in particular that the vehicle may drive independently on a parking facility, or may park and/or unpark independently, respectively, without a driver having to steer the vehicle for this purpose. Such an autonomously driving vehicle, which may park and unpark automatically, may be referred to, for example, as an AVP vehicle. AVP stands for "automated valet parking" and may be translated as "automatic parking procedure." Vehicles which do not have this AVP functionality are referred to, for example, as normal vehicles.

In general, within the scope of an AVP procedure, the vehicle drives without a driver to its parking position. This thus means that a driver does not know at all where his vehicle was parked in a parking facility. However, because according to one specific embodiment it is provided that the position of the parking position is transmitted via the communication network, the driver may advantageously be made aware of this position.

According to one specific embodiment, the communication network includes a WLAN and/or a mobile communications network.

According to one specific embodiment, a communication via the communication network is or becomes encrypted, respectively.

In another specific embodiment it is provided that the unparking data include such data that the vehicle may carry out one of the following unparking maneuvers: partially driving out of the parking position with subsequent stopping, completely driving out of the parking position with subsequent stopping, completely driving out with subsequent stopping longitudinally in relation to or in a driving lane.

This thus means in particular that the vehicle carries out one of the above-mentioned unparking maneuvers autonomously or by remote control or autonomously combined with remote control.

Partially driving out of the parking position with subsequent stopping has the technical advantage in particular that potential vehicle traffic in the surroundings of the parking position is only interfered with slightly or not at all. In general, partially driving out of the parking position is already sufficient, so that at least one vehicle door may be opened to obtain access to the vehicle interior.

Completely driving out of the parking position with subsequent stopping has the technical advantage in particular that more effective and efficient access to the vehicle interior is enabled by opening all vehicle doors.

Completely driving out with subsequent stopping longitudinally in relation to or in a driving lane has the technical advantage in particular that although the vehicle was driven completely out of the parking position, it nonetheless only interferes with potential vehicle traffic in the surroundings of the parking position to a minor extent. Because stopping longitudinally in relation to or in a driving lane interferes with potential vehicle traffic significantly less than if the vehicle were stopped transversely in relation to or in a driving lane.

In another specific embodiment it is provided that based on a present and/or predicted traffic situation in the surroundings of the parking position, it is ascertained whether at least one of the unparking maneuvers may be carried out; if none of the unparking maneuvers is able to be carried out, one of the following actions is carried out:
  transmitting a message to a sender of the access request that the access request is to be transmitted once again at a later point in time, or that the access option may only be provided at a later point in time, or
  transmitting data to the vehicle via the communication network, based on which the vehicle may drive to a destination position, at which the access may be carried out.

This yields the technical advantage in particular that although none of the unparking maneuvers may be carried out, possible alternatives are nonetheless provided to obtain access to the vehicle interior. According to one alternative it is provided that the access is thus to be carried out at a later point in time. According to another alternative it is provided that the vehicle drives to a destination position at which the access may be carried out.

Such a destination position is, for example, according to one specific embodiment, a drop-off position, which is associated with a parking facility or is included in a parking facility. At such a drop-off position, a driver of the vehicle drops off his vehicle, so that it carries out an autonomous parking procedure beginning from this drop-off position.

A destination position may be, for example, different from such a drop-off position and may be, for example, a position within the parking facility which is particularly suitable for carrying out an access to the vehicle interior, without interfering with vehicle traffic in the parking facility for this purpose.

In another specific embodiment it is provided that the access request includes a duration which specifies how long the access is necessary, and/or the access request includes a piece of information about which vehicle window and/or which vehicle doors is to be opened for the access, the unparking maneuver being selected from the three unparking maneuvers which the vehicle is to carry out depending on the duration and/or depending on the piece of information.

This yields the technical advantage in particular that it may be ascertained or decided efficiently and effectively which of the unparking maneuvers is to be carried out. Because if, for example, an access to the vehicle is only necessary for a short period of time, for example, two minutes, the vehicle may thus be driven completely out of the parking position. This is in comparison to the case in which an access is desired for a longer duration of for example, five minutes. If a trunk door or trunk lid has to be opened, for example, in general the vehicle thus has to be driven completely out of the parking position for this purpose.

In another specific embodiment it is provided that a starting signal for starting the pullout from the parking position is only transmitted via the communication network to the vehicle when a sender of the access request is detected in the surroundings of the vehicle and/or when a sender of the access request has reported that he/she is located in the surroundings of the vehicle. This yields the technical advantage in particular that the pullout from the parking position is not carried out excessively early, i.e., at a point in time at which a person who could carry out the access is not yet at the vehicle. This may thus advantageously prevent vehicle traffic in the surroundings of the parking position from being unnecessarily disturbed.

According to one specific embodiment it is provided that the sender is a driver of the vehicle.

According to one specific embodiment it is provided that the detection is carried out with the aid of a monitoring system.

According to one specific embodiment, a monitoring system includes one or multiple of the following surroundings sensors: video sensor, radar sensor, ultrasonic sensor, LIDAR sensor, laser sensor. In particular, according to one specific embodiment, the monitoring system includes one or multiple light barriers and/or one or multiple door opening sensors.

The reporting of the sender of the access request that he/she is located in the surroundings of the vehicle may be carried out in particular as follows. The sender transmits a corresponding message, for example, via the communication network. This thus means in particular that a corresponding message is then received via the communication network.

According to another specific embodiment, the device for providing an access option to a vehicle interior of a vehicle parked at a parking position is configured or designed to execute or carry out the method for providing an access option to a vehicle interior of a vehicle parked at a parking position.

Device features result similarly from corresponding method features. This thus means in particular that technical functionalities relating to the device result from corresponding functionalities of the method and vice versa. This thus means in particular that the communication interface is designed accordingly for receiving and/or transmitting corresponding data. In particular, this means, for example, that the processor is designed accordingly to ascertain data or to select one of the unparking maneuvers.

The present invention is explained in greater detail below on the basis of preferred exemplary embodiments.

BRIEF DESCRIPTION OF THE DRAWINGS

FIG. 3 shows a disturbance of traffic as a result of the second unparking maneuver according to FIG. 2.
FIG. 4 shows a third unparking maneuver.
FIG. 5 shows a flow chart of a method for providing an access option to a vehicle interior of a vehicle parked at a parking position.

DETAILED DESCRIPTION OF EXAMPLE EMBODIMENTS

Figure 1:
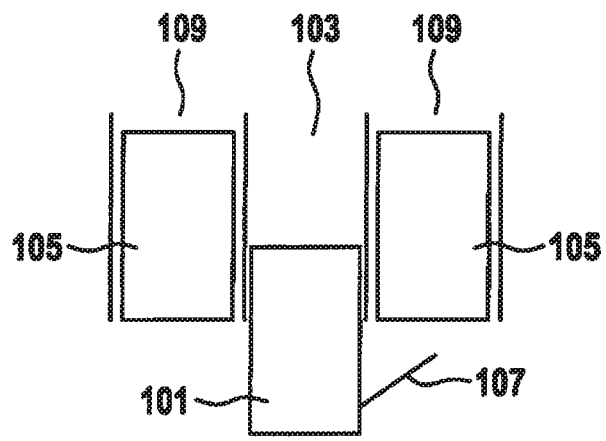
FIG. 1 shows a first unparking maneuver.

FIG. 1 shows a first unparking maneuver.

In this case, a vehicle 101 unparks from its parking position 103. A further vehicle 105 is parked in each case to the left and right adjacent to vehicle 101. The parking positions of further vehicles 105 are identified by reference numeral 109. When vehicle 101 stands completely on its parking position, opening of a vehicle door 107 is thus not possible without striking further vehicles 105 (cf. also FIG. 8). This thus means that when vehicle 101 stands completely on its parking position 103, opening of a vehicle door 107 is not possible. An access to a vehicle interior of vehicle 101 is thus not possible. This is shown clearly in FIG. 8.

Figure 8:
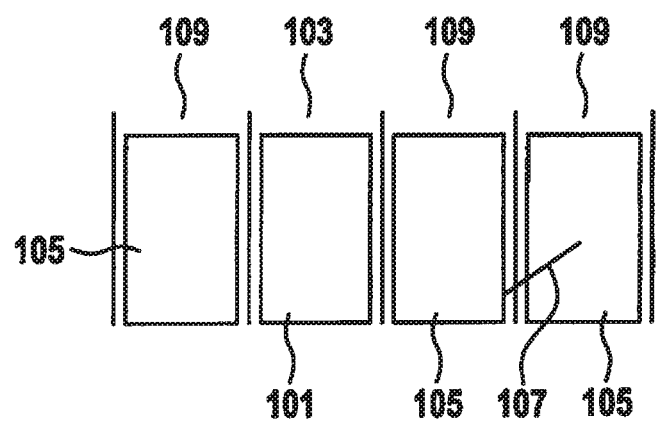
FIG. 8 shows a vehicle parked at a parking position.
Identical reference numerals may be used for identical features hereafter.

FIG. 8 symbolically shows how vehicle 101 is parked completely at its parking position 103. Further vehicles 105 are parked on the left and right adjacent to vehicle 101. Opening of vehicle door 107 to obtain access to the vehicle interior is not possible because of the tight clearance. Vehicle door 107 is nonetheless shown in an open state for the purpose of clarification, to illustrate that it would collide with further vehicle 105. In reality, vehicle door 107 could not open as far as shown in FIG. 8, however.

An unparking maneuver, as it may be used within the meaning of the present invention, includes in particular that vehicle 101 partially leaves its parking position 103. FIG. 1 shows this symbolically. Vehicle 101 thus still partially stands on parking position 103. Vehicle 101 partially stands outside parking position 103. It leaves parking position 103 to the extent that at least one vehicle door 107 may be opened. In FIG. 1, this is a driver door, which is shown in an open state. In one specific embodiment which is not shown, a passenger door, which is not explicitly shown here, may also be opened additionally or alternatively to driver door 107. An access to a vehicle interior of vehicle 101 may now be carried out because of open driver door 107.

After the end of the access, according to one specific embodiment it is provided that the vehicle advantageously drives back into parking position 103, so that the vehicle is subsequently again parked completely at parking position 103.

Figure 2:
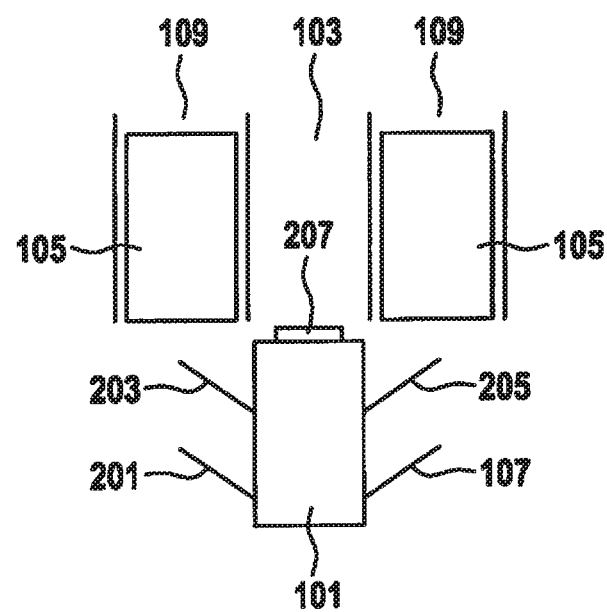
FIG. 2 shows a second unparking maneuver.

FIG. 2 shows a second unparking maneuver.

According to this second unparking maneuver, vehicle 101 completely leaves its parking position 103.

Due to the fact that vehicle 101 has completely left its parking position, i.e., has completely unparked, all four vehicle doors, passenger door 201 and two vehicle doors 203, 205 for the rear vehicle occupants and also a rear lid or trunk lid or trunk door 207, may be opened enabling access to a vehicle interior of the vehicle.

This thus means that an access is provided via all vehicle doors 107, 201, 203, 205 and trunk lid 207.

Similarly to the first unparking maneuver according to FIG. 1, according to one specific embodiment it is provided that after an end of the access, i.e., in particular when access is no longer needed, vehicle 101 drives back into its parking position 103.

FIG. 3 shows a scenario which symbolically illustrates that a disturbance in traffic may occur as a result of the unparking maneuver according to FIG. 2.

As FIG. 3 shows, vehicle 101 has thus completely unparked. It has thus completely left its parking position 103. However, the vehicle has thus moved onto two driving lanes 301, 303. This means that vehicle 101 stands transversely in relation to the two driving lanes 301 and 303. A further vehicle 305 is interfered with by vehicle 101 as it travels on driving lane 301. A travel direction of vehicle 305 is indicated by an arrow having reference numeral 307. Vehicle 101 thus represents an obstruction to further vehicle 305. This thus means that further vehicle 305 has to stop, for example, so that a collision does not occur with vehicle 101. A flow of traffic is thus obstructed or stopped.

The fact that vehicle 101 interferes with further vehicle 305 in its unparked position is symbolically shown by a jagged arrow in the form of lightning having reference numeral 309.

FIG. 4 shows a third unparking maneuver, which may reduce or even prevent interference in the traffic according to FIG. 3.

Vehicle 101 has also completely left its parking position 103 here, but no longer stands transversely in relation to the two driving lanes 301 and 303, but rather longitudinally in driving lane 301 and therefore longitudinally in relation to driving lane 303. The vehicle thus drove out to the right in relation to its unparking direction from its parking position 103, which is shown here symbolically by an arrow having reference numeral 401.

Due to this unparking maneuver, one driving lane, driving lane 303, remains free for traffic. Further vehicle 305 may thus advantageously drive laterally past vehicle 101. A possible trajectory for this purpose for further vehicle 305 is symbolically identified by an arrow having reference numeral 403. This thus means that the third unparking maneuver may advantageously prevent interfering with a flow of traffic, or at least a possible interference or obstruction is minimized.

FIG. 5 shows a flow chart of a method for providing an access option to a vehicle interior of a vehicle parked at a parking position.

The method includes the following steps:
receiving 501 an access request for an access to the vehicle interior via a communication network,
in response to the received access request, ascertaining 503 unparking data, based on which the vehicle may at least partially leave its parking position, to provide an access option to the vehicle interior by opening a vehicle window and/or a vehicle door,
transmitting 505 the ascertained unparking data to the vehicle via the communication network,
receiving 507 a signal via the communication network that the access option is no longer needed,
in response to the signal, ascertaining 509 parking data, based on which the vehicle may drive back into its parking position, and
transmitting 511 the ascertained parking data to the vehicle via the communication network.

The unparking data include, for example, such data, based on which the vehicle may carry out one of the unparking maneuvers described in conjunction with FIGS. 1 through 4.

Figure 6:
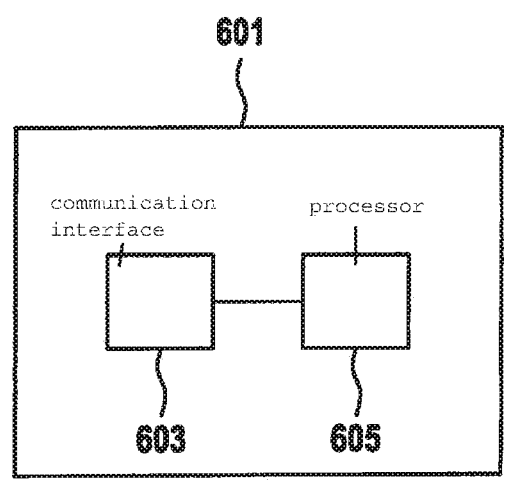
FIG. 6 shows a device for providing an access option to a vehicle interior of a vehicle parked at a parking position.

FIG. 6 shows a device 601 for providing an access option to a vehicle interior of a vehicle parked at a parking position.

Device 601 includes:
a communication interface 603 for receiving an access request for an access to the vehicle interior via a communication network,
a processor 605 for ascertaining unparking data in response to the received access request, based on which the vehicle may at least partially leave its parking position, to provide an access option to the vehicle interior by opening a vehicle window and/or a vehicle door,
communication interface 603 being designed to transmit the ascertained unparking data to the vehicle via the communication network,
communication interface 603 being designed to receive a signal via the communication network that the access option is no longer needed,
processor 605 being designed, in response to the received signal, to ascertain parking data, on the basis of which the vehicle may drive back into its parking position, and
communication interface 603 being designed to transmit the ascertained parking data to the vehicle via the communication network.

Figure 7:
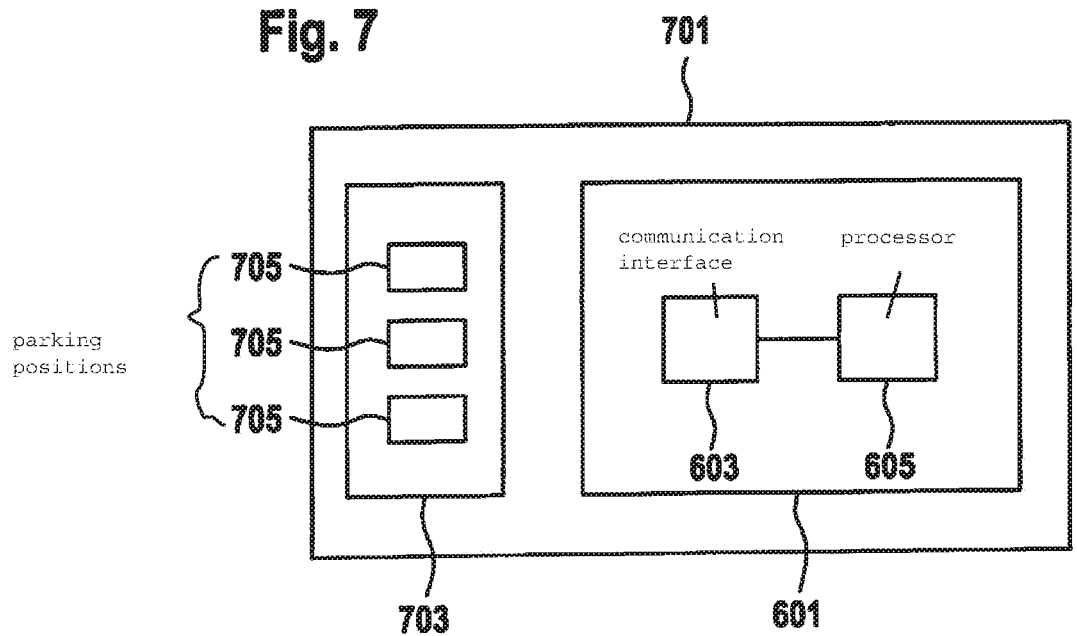
FIG. 7 shows a parking system for vehicles.

FIG. 7 shows a parking system 701 for vehicles.

Parking system 701 includes a parking facility 703, which has multiple parking positions 705. According to FIG. 7, three parking positions are shown. More or fewer than three parking positions 705 are provided in specific embodiments which are not shown.

Parking system 701 furthermore includes device 601 of FIG. 6.

The present invention thus includes in particular, inter alia, the idea of providing an efficient concept, based on which a short-term or temporary access or entry is enabled for a person, for example, the driver, to the vehicle at its parking position. According to the present invention, the vehicle drives out of the parking position automatically or autonomously or by remote control. This takes place only to the extent, according to one specific embodiment, that an entry or an access (both terms may be used synonymously) is possible, in particular that at least one vehicle door and/or one vehicle window is opened.

According to one specific embodiment, the vehicle only drives out of the parking position when the other traffic, i.e., traffic in the surroundings of the parking position, is not disturbed in this way.

FIG. 1 symbolically shows minimal unparking here, to enable an entry or an access via a door, driver door 107 by way of example in FIG. 1.

FIG. 2 symbolically shows minimal unparking here, to enable an entry or access via all vehicle doors and the trunk.

FIG. 3 symbolically shows here that the other traffic may be disturbed by the temporary unparking according to FIG. 2.

FIG. 4 shows a possible answer to the problem shown in FIG. 3. The vehicle is unparked here in such a way that the other traffic is not disturbed and/or may drive past the unparking procedure, i.e., in particular the unparked vehicle.

According to one specific embodiment it is provided that the procedure of unparking is coordinated by a parking garage management system. Such a parking garage management system includes, for example, the device according to the present invention. In general, according to one specific embodiment, such a parking garage management system also coordinates AVP traffic on a parking facility. In general, a parking facility management system may be provided instead of the parking garage management system.

According to one specific embodiment it is provided that a driver or a passenger or another person, i.e., a person in general, applies for access request to the vehicle, which is parked at a parking position, with the parking facility management system, i.e., in general with the device. This thus means that the person applies for this entry or access via a communication network and therefore, for example, transmits a corresponding message, i.e., an access request via the communication network. This may be carried out, for example, with the aid of a mobile terminal, for example, with the aid of a smart phone, and/or a terminal, for example, a parking garage terminal, at the parking facility itself.

This thus means that the device according to the present invention receives such an access request via its communication interface.

According to one specific embodiment, the access request includes a time specification, of how long the entry or the access is needed. This thus means that the access request includes a duration which specifies how long the access is needed.

According to one specific embodiment, the access request includes a piece of information regarding the type of access, i.e., which access is needed. This thus means which vehicle door and/or which vehicle window are to be opened or whether the trunk lid is to be opened.

According to one specific embodiment, it is decided or ascertained on the basis of the above-mentioned pieces of information (for example, the duration and the information about which vehicle window and/or which vehicle door is/are to be opened for the access) whether such an access is possible at all. In particular, a present and/or predicted traffic situation in the surroundings of the parking position and in particular on the parking facility itself are taken into consideration in this decision.

If an access is not possible at the desired time or at present, according to one specific embodiment it is provided that this is communicated to the person who has transmitted the access request, i.e., the sender of the access request, for example, the driver.

According to one specific embodiment, the following alternatives are provided:

A first alternative includes that a message is transmitted to the sender of the access request that the access request is to be transmitted once again at a later point in time, or the access option may only be provided at a later point in time.

One alternative includes that the vehicle drives to a drop-off position or drop-off point and drives back to the parking position after an end of the entry or access.

One alternative includes that the vehicle drives to a separate access point and drives back to the parking position after the end of the access.

In general, one alternative includes that the vehicle drives to a destination position, at which the access may be carried out.

According to one specific embodiment it is provided that the position of the parking position is transmitted via the communication network to the sender of the access request. For example, the position of the vehicle, i.e., the parking position, is communicated via the communication network to the driver. For example, a route to the vehicle is transmitted via the communication network to the sender of the access request. For example, a digital map is provided via the communication network to the sender of the access request.

The sender of the access request, for example, the driver, walks to the vehicle. According to one specific embodiment it is provided that this procedure is recognized or detected with the aid of a parking facility management system. According to one specific embodiment it is provided that the sender, for example, the driver, reports to the device that he/she is at the vehicle. He/she can carry this out, for example, via a mobile terminal, for example, via a smart phone.

According to one specific embodiment it is provided that the device ascertains how the unparking procedure is to be carried out, for example, according to one of the above-mentioned unparking maneuvers. For example
partially driving out, for example, only to the extent that the entry via one door is possible, or
for example, completely driving out, or
completely driving out and parking on the driving lane.

According to one specific embodiment, it is first ascertained which unparking procedure is carried out when the driver or in general the sender of the access request is at the vehicle.

According to one specific embodiment it is provided that the unparking procedure is started or enabled, respectively, upon authorization by the device or in general by the parking facility management system.

The vehicle then unparks. In this case, the unparking procedure may be remote controlled by the device or the vehicle unparks based on vehicle-intrinsic systems, i.e., autonomously. In the latter case, according to one specific embodiment it is provided that the data needed for this purpose are transmitted by the device, i.e., in general by the parking facility management system, to the vehicle.

After the entry or access is ended and the sender of the access request, for example, the driver, has communicated or transmitted this to the device or has confirmed this, the vehicle parks again. This is similar to the unparking, for example, i.e., autonomously or by remote control, for example.

According to one specific embodiment it may be provided that only complete unparking with stopping on the driving lane may be provided or possible. This is the case, for example, if the vehicle is only capable of carrying out such an unparking maneuver.

According to one specific embodiment, the procedure, in particular the unparking and/or the parking procedure and/or the access, is monitored by the parking facility monitoring system.

The present invention thus efficiently enables a temporary entry or access to the vehicle. This takes place in particular in that a vehicle parked at a parking position is driven out to the extent that an access to the vehicle interior is created, by opening one or multiple vehicle doors and/or one or multiple vehicle windows. The vehicle may be driven out, for example, completely or partially. In general, a vehicle door may be, for example, a trunk lid or a trunk door.

This advantageously yields the technical advantage that within the scope of an AVP procedure, the AVP vehicles may be parked so closely adjacent to one another that usually an entry or an access to the vehicle interior via the doors and/or the trunk is no longer possible, so that an existing parking area or an existing parking lot may be efficiently used. In the event that a temporary entry or a temporary access is necessary, the vehicle may be unparked temporarily, i.e., for a short time, i.e., for a predetermined duration, according to one of the above-mentioned unparking maneuvers. After the end of the access, the vehicle drives back into its parking position. Thus, for example, an important medication may be retrieved from the vehicle.

What is claimed is:

1. A method for providing an access option to a vehicle interior of a vehicle parked at a parking position, comprising:
    receiving an access request for an access to the vehicle interior via a communication network;
    in response to the received access request, ascertaining unparking data, based on which the vehicle may at least partially leave its parking position, to provide an access option to the vehicle interior by opening at least one of a vehicle window and a vehicle door;
    transmitting the ascertained unparking data to the vehicle via the communication network;
    receiving a signal via the communication network that the access option is no longer needed;
    in response to the signal, ascertaining parking data, based on which the vehicle may drive back into its parking position; and
    transmitting the ascertained parking data to the vehicle via the communication network;
    wherein the unparking data include such data that the vehicle carries out one of the following three unparking maneuvers: (i) partially driving out of the parking position with subsequent stopping, or (ii) completely driving out of the parking position with subsequent stopping, or (iii) completely driving out with subsequent stopping longitudinally in relation to or in a driving lane;
    wherein the access request includes a piece of information that indicates (i) which vehicle window is to be opened for the access, and/or (ii) which vehicle door is to be opened for the access; and
    wherein one of the three unparking maneuvers which the vehicle is to carry out is selected depending on the piece of information.

2. The method as recited in claim 1, wherein at least one of the unparking data and the parking data include at least one remote control command, based on which the vehicle is at least one of unparked and parked, the at least one of unparked and parked being by remote control.

3. The method as recited in claim 1, wherein at least one of the unparking data and the parking data include such data, based on which the vehicle at least one of (i) unparks automomously, and (ii) park autonomously.

4. The method as recited in claim 1, wherein in response to the received access request, position data of the parking position are transmitted via the communication network.

5. The method as recited in claim 1, wherein it is ascertained, based on a present and/or predicted traffic situation in the surroundings of the parking position, whether at least one of the unparking maneuvers may be carried out; if none of the unparking maneuvers may be carried out, one of the following actions is carried out: (i) transmitting a message to a sender of the access request that the access request is to be transmitted once again at a later point in time, or the access option may only be provided at a later point in time, or (ii) transmitting data to the vehicle via the communication network, based on which the vehicle drives to a destination position, at which the access may be carried out.

6. The method as recited in claim 1, wherein a start signal for starting the pullout from the parking position is transmitted via the communication network to the vehicle only at least one of: (i) when a sender of the access request is detected in surroundings of the vehicle, and (ii) when a sender of the access request has reported that the sender is located in the surroundings of the vehicle.

7. A device for providing an access option to a vehicle interior of a vehicle parked at a parking position, comprising:
    a communication interface for receiving an access request for an access to the vehicle interior via a communication network; and
    a processor for ascertaining unparking data in response to the received access request, based on which the vehicle may at least partially leave its parking position to provide an access option to the vehicle interior by opening a vehicle window and/or a vehicle door;
    wherein the communication interface is designed to transmit the ascertained unparking data to the vehicle via the communication network, the communication interface is designed to receive a signal via the communication network that the access option is no longer needed, the processor is designed to ascertain, in response to the received signal, parking data, based on which the vehicle drives back into its parking position, and the communication interface is designed to transmit the ascertained parking data to the vehicle via the communication network;
    wherein the unparking data include such data that the vehicle carries out one of the following three unparking maneuvers: (i) partially driving out of the parking position with subsequent stopping, or (ii) completely driving out of the parking position with subsequent stopping, or (iii) completely driving out with subsequent stopping longitudinally in relation to or in a driving lane;
    wherein the access request includes a piece of information that indicates (i) which vehicle window is to be opened for the access, and/or (ii) which vehicle door is to be opened for the access; and
    wherein one of the three unparking maneuvers which the vehicle is to carry out is selected depending on the piece of information.

8. A parking system for vehicles, comprising:
a parking facility having multiple parking positions; and
a device for providing an access option to a vehicle interior of a vehicle parked at one of the parking positions, the device including:
- a communication interface for receiving an access request for an access to the vehicle interior via a communication network, and
- a processor for ascertaining unparking data in response to the received access request, based on which the vehicle may at least partially leave its parking position to provide an access option to the vehicle interior by opening a vehicle window and/or a vehicle door, wherein the communication interface is designed to transmit the ascertained unparking data to the vehicle via the communication network, the communication interface is designed to receive a signal via the communication network that the access option is no longer needed, the processor is designed to ascertain, in response to the received signal, parking data, based on which the vehicle drives back into its parking position, and the communication interface is designed to transmit the ascertained parking data to the vehicle via the communication network;

wherein the unparking data include such data that the vehicle carries out one of the following three unparking maneuvers: (i) partially driving out of the parking position with subsequent stopping, or (ii) completely driving out of the parking position with subsequent stopping, or (iii) completely driving out with subsequent stopping longitudinally in relation to or in a driving lane;

wherein the access request includes a piece of information that indicates (i) which vehicle window is to be opened for the access, and/or (ii) which vehicle door is to be opened for the access; and wherein one of the three unparking maneuvers which the vehicle is to carry out is selected depending on the piece of information.

9. A non-transitory computer-readable storage medium on which is stored a computer program including program code for providing an access option to a vehicle interior of a vehicle parked at a parking position, the computer program, when executed by a computer, causing the computer to perform:
receiving an access request for an access to the vehicle interior via a communication network;
in response to the received access request, ascertaining unparking data, based on which the vehicle may at least partially leave its parking position, to provide an access option to the vehicle interior by opening at least one of a vehicle window and a vehicle door;
transmitting the ascertained unparking data to the vehicle via the communication network;
receiving a signal via the communication network that the access option is no longer needed;
in response to the signal, ascertaining parking data, based on which the vehicle may drive back into its parking position; and
transmitting the ascertained parking data to the vehicle via the communication network;
wherein the unparking data include such data that the vehicle carries out one of the following three unparking maneuvers: (i) partially driving out of the parking position with subsequent stopping, or (ii) completely driving out of the parking position with subsequent stopping, or (iii) completely driving out with subsequent stopping longitudinally in relation to or in a driving lane;
wherein the access request includes a piece of information that indicates: (i) which vehicle window is to be opened for the access, and/or (ii) which vehicle door is to be opened for the access, and
wherein one of the three unparking maneuvers which the vehicle is to carry out is selected depending on the piece of information.

10. A method for providing an access option to a vehicle interior of a vehicle parked at a parking position, comprising:
receiving an access request for an access to the vehicle interior via a communication network;
in response to the received access request, ascertaining unparking data, based on which the vehicle may at least partially leave its parking position, to provide an access option to the vehicle interior by opening at least one of a vehicle window and a vehicle door;
transmitting the ascertained unparking data to the vehicle via the communication network;
receiving a signal via the communication network that the access option is no longer needed;
in response to the signal, ascertaining parking data, based on which the vehicle may drive back into its parking position; and
transmitting the ascertained parking data to the vehicle via the communication network;
wherein the unparking data include such data that the vehicle carries out one of the following three unparking maneuvers: (i) partially driving out of the parking position with subsequent stopping, or (ii) completely driving out of the parking position with subsequent stopping, or (iii) completely driving out with subsequent stopping longitudinally in relation to or in a driving lane;
wherein the access request includes a duration which specifies how long the access is needed; and
wherein one of the three unparking maneuvers which the vehicle is to carry out is selected based on the duration.

* * * * *